A. KAMP.
VARIABLE SLIDING CONE FEED FOR WOODWORKING MACHINERY.
APPLICATION FILED MAR. 27, 1915.
1,230,718.
Patented June 19, 1917.
2 SHEETS—SHEET 2.
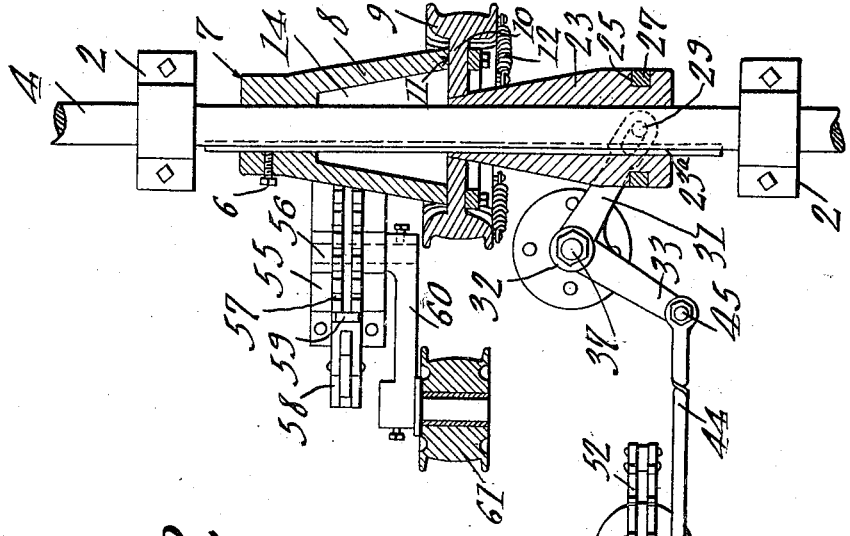
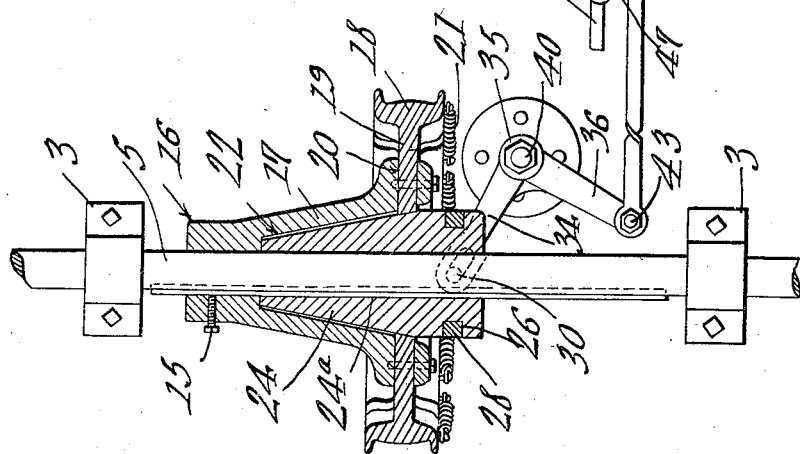
Witnesses
Inventor
A. Kamp
by C. A. Snow & Co.
Attorneys

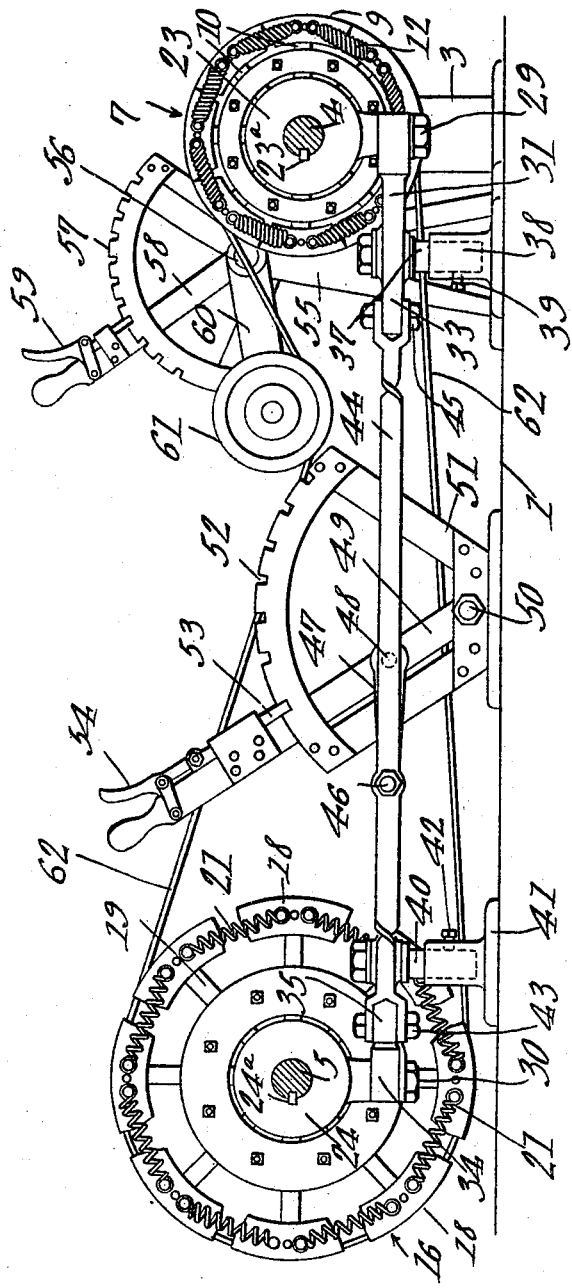

UNITED STATES PATENT OFFICE.

ALBERT KAMP, OF NIAGARA FALLS, NEW YORK.

VARIABLE SLIDING-CONE FEED FOR WOODWORKING MACHINERY.

1,230,718.   Specification of Letters Patent.   Patented June 19, 1917.

Application filed March 27, 1915. Serial No. 17,452.

*To all whom it may concern:*

Be it known that I, ALBERT KAMP, a citizen of the United States, residing at Niagara Falls, in the county of Niagara and State of New York, have invented a new and useful Variable Sliding-Cone Feed for Woodworking Machinery, of which the following is a specification.

The device forming the subject matter of this application is adapted to be employed for coupling up operatively, a driven shaft with a driving shaft, to the end that the driven shaft may be rotated at different speeds, the driving shaft rotating at uniform speed.

Specifically, the invention aims to provide a novel means for shifting a pair of cones which, entering within the contour of expansible pulleys, vary the radii of the pulleys.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 is a vertical sectional view wherein most parts of the invention appear in elevation;

Fig. 2 is a top plan wherein divers parts are sectioned.

In carrying out the present invention there is provided a supporting structure embodying a base 1 and bearings 2 and 3. In the bearings 2 is journaled for rotation a drive shaft 4 which rotates at a uniform speed. Journaled in the bearings 3 is a driven shaft 5 which is rotated to a variable driven speed. Secured as indicated at 6 in any suitable manner to the drive shaft 4 is a pulley denoted generally by the numeral 7 and comprising a head 8. The pulley 7 embodies shoes 9 constituting an expansible rim, the shoes being provided with shanks 10 received slidably in radial recesses 11 in the head 8 of the pulley 7. Adjacent shoes 9 are connected by retractile springs 12 preferably of helical form. In the head portion 8 of the pulley 7 is formed a conical socket 14.

Secured in any appropriate way as indicated at 15, to the driven shaft 5 is a pulley denoted generally by the numeral 16 and embodying a head 17 and shoes 18 forming an expansible rim, the shoes including shanks 19 mounted to slide in radial recesses 20 formed in the head 17. Adjacent shoes 18 are connected by retractile springs 21 which may be of helical form. In the head 17 of the pulley 16 is formed a socket 22.

An actuating member in the form of a cone 23 is splined as shown at 23$^a$ upon the drive shaft 4 to move longitudinally thereon and to rotate therewith. An actuating member in the form of a cone 24 is similarly connected as shown at 24$^a$ with the driven shaft 5. The cone 23 is provided with a circumscribing groove 25 and in the cone 24 there is formed a groove 26. The cone 23 rotates in a collar 27 located in the groove 25, the cone 24 rotating in a collar 28 located in the groove 26. On the collar 27 is a projection 29, the collar 28 being provided with a projection 30. The projection 29 on the collar 27 works loosely in a slot formed in one arm 31 of a horizontally swinging bell crank 32, the other arm of which is denoted by the numeral 33. The projection 30 on the ring or collar 28 works loosely in a slot formed in one arm 34 of a bell crank lever 35 comprising an arm 36. The bell crank lever 32 is fulcrumed on a standard 37 vertically movable in a socket or base 38 and is held in adjusted positions by means of a set screw 39. The bell crank lever 35 is fulcrumed on a standard 40 vertically adjustable in a socket or base 41 and is held in place by a set screw 42.

A connection in the form of a rod 44 is pivoted at 43 to the arm 36 of the bell crank 35, the opposite end of the connecting rod 44 being pivoted as shown at 45 to the arm 33 of the bell crank 32. A pivot element 46 connects one end of a link 47 with the rod 44, the other end of the link 47 being pivoted as shown at 48 to a lever 49 fulcrumed at 50 on a segment 51 including a rack 52 adapted to be engaged by a latch 53 on the lever 49, the latch being operated by means of an auxiliary lever 54 mounted on the main lever 49.

Fixed to and upstanding from the base 1 or otherwise supported is a frame 55 in which is journaled to rock a shaft 56, the frame 55 carrying a segment 57.

Secured to the shaft 56 is a lever 58 provided with latch mechanism 59 adapted to coact with a segment 57. The shaft 56 is equipped with an arm 60 on which is journaled a wheel 61 adapted to bear with a varying pressure on the upper run of a belt 62 trained about the expansible portions 18 and 9 of the pulleys 16 and 7 respectively.

In practical operation, when the main lever 49 is swung in one direction, the connecting rod 44 is moved in the same direction, the bell cranks 32 and 35 being tilted, the cone 23 being retracted, and the cone 24 being advanced. When the cone 23 thus is retracted, the diameter of the pulley 7 is decreased, since the shoes 9 are drawn inwardly by the action of the springs 12, the inner ends of the shanks 10, of course, being in contact with the cone 23. In a similar manner, when the cone 24 is advanced, the cone bears against the shanks 19 and forces the shoes 18 outwardly, thus increasing the radius of the pulley 16.

A reversal of the operation above described will increase the diameter of the pulley 7 and decrease the diameter of the pulley 16. The main lever 49 may be locked in adjusted positions by engaging the latch 53 with the rack portion 52 of the segment 51, thereby holding the cones 23 and 24 in the positions to which they have been adjusted.

It is to be observed that the shaft 56 may be rocked by means of the lever 58, thereby moving the arm 60 and the wheel 61 vertically with respect to the upper run of the belt. The construction, therefore, is such that the pulleys 16 and 7 may be driven by a loose belt or a tight belt, as is found desirable.

Having thus described the invention, what is claimed is:—

In a device of the class described, a pair of shafts; pulleys mounted on the shafts and provided with hollow heads having radial openings; segmental shoes disposed about the heads and including reduced stems mounted for right line movement in the openings; separate, circumferentially retractile springs connected at their ends with the outer faces of adjacent shoes beyond the ends of the pulleys; cones slidable on the shafts within the heads and engaging the inner ends of the stems; levers fulcrumed adjacent the shafts; means for connecting the levers with the cones; a connection between the levers; and means under the control of an operator for actuating the last specified connection.

In testimony that I claim the foregoing as my own, I have hereto affixed my signature in the presence of two witnesses.

ALBERT KAMP.

Witnesses:
 WALTER S. BRINKLEY,
 DALE M. BOOTHMAN.

Copies of this patent may be obtained for five cents each, by addressing the "Commissioner of Patents, Washington, D. C."